(12) United States Patent
Lissandre et al.

(10) Patent No.: US 10,721,547 B2
(45) Date of Patent: Jul. 21, 2020

(54) SELF-CONTAINED DETECTOR, AND MAPPING DEVICE AND METHOD INCLUDING SUCH A DETECTOR

(71) Applicants: Marie-Anne Lissandre, Saint Michel d'Euzet (FR); Aurelien Ballier, Cavillargues (FR)

(72) Inventors: Marie-Anne Lissandre, Saint Michel d'Euzet (FR); Aurelien Ballier, Cavillargues (FR)

(*) Notice: Subject to any disclaimer, the term of this patent is extended or adjusted under 35 U.S.C. 154(b) by 0 days.

(21) Appl. No.: 16/091,981

(22) PCT Filed: Apr. 13, 2017

(86) PCT No.: PCT/FR2017/050888
§ 371 (c)(1),
(2) Date: Oct. 6, 2018

(87) PCT Pub. No.: WO2017/178763
PCT Pub. Date: Oct. 19, 2017

(65) Prior Publication Data
US 2019/0098378 A1   Mar. 28, 2019

(30) Foreign Application Priority Data
Apr. 13, 2016  (FR) ..................... 16 53248

(51) Int. Cl.
*H04Q 9/00*   (2006.01)
*G01D 11/24*  (2006.01)

(52) U.S. Cl.
CPC ............. *H04Q 9/00* (2013.01); *G01D 11/24* (2013.01); *G01D 11/245* (2013.01); *H04Q 2209/40* (2013.01); *H04Q 2209/88* (2013.01)

(58) Field of Classification Search
None
See application file for complete search history.

(56) References Cited

U.S. PATENT DOCUMENTS

| | | | |
|---|---|---|---|
| 9,195,798 B2 * | 11/2015 | Vilsmeier | G16H 40/63 |
| 10,277,962 B2 * | 4/2019 | Gallo | G01D 1/18 |
| 2013/0222115 A1 * | 8/2013 | Davoodi | H04Q 9/00 340/10.1 |
| 2015/0155920 A1 * | 6/2015 | Talnishnikh | H04B 7/04 455/500 |

* cited by examiner

Primary Examiner — Curtis A Kuntz
Assistant Examiner — Jerold B Murphy
(74) Attorney, Agent, or Firm — Patshegen IP LLC; Moshe Pinchas

(57) ABSTRACT

The invention relates to a self-contained detector (100) for measuring a physical quantity, which includes:
- at least one sensor (105) for sensing a value representing a physical quantity;
- a geolocation means (110), configured to provide geolocation coordinates of the detector;
- an emitter (145) of a wireless signal representing each detected value and the determined coordinates; and
- a self-contained electric power source (120) configured to power the detector, each sensor, the geolocation means, the emitter and the power source being embedded in a flexible, shock-resistant shell (125), and in a sealed shell (130).

8 Claims, 4 Drawing Sheets

SELF-CONTAINED DETECTOR, AND MAPPING DEVICE AND METHOD INCLUDING SUCH A DETECTOR

TECHNICAL FIELD OF THE INVENTION

The present invention envisages a self-contained detector for measuring a physical quantity, a measurement mapping device and a method of measurement. It applies, in particular, to the field of operations in contaminated sites, or following a seismic event or fire, for example.

STATE OF THE ART

On an industrial site utilizing radioactive elements or chemical compounds that are potentially toxic and harmful to human health, mapping of the presence of a risk must be carried out before any human intervention.

This mapping is based on measurements made on the site.

This type of measurement is traditionally made with instruments for measuring radioactivity or a physical quantity, which are operated either directly by an operator positioned a short distance from the material to be investigated, at best having a pole fitted with a detector at one end for relative remoteness, or by a carrier robot whose use is limited, complex, long and costly, or quite simply impossible because of the layout of the site to be mapped.

Thus, current systems limit the distance between the human presence and the matter to be investigated, which, depending on the levels of radiological and/or chemical toxicity, can generate unacceptable operator exposure conditions, making the measurements impossible.

Failing this, the interventions can be limited and partial; thus the radioactive measurement systems traditionally used possibly may lead to missing areas or areas with hard-to-quantify measurement errors making the maps impossible to use.

The distance constraint linked to the use of conventional radioactive measurement systems makes investigations impossible in places where safety conditions are unsuitable for human intervention or where they may change during the intervention, such as ground that is unstable after damage to a building's structure, or after an earthquake.

The radioactive measurement systems traditionally used require readings to be taken almost point by point, which affects the total acquisition time for the number of measurements and does not allow the necessary responsiveness in the face of accidental, possibly widespread, events.

Techniques using measurements to produce the maps are traditionally used after in situ measurements are made beforehand, preventing real time analysis of the values. To obtain a complete map, it is necessary to fine-tune the input data by number of measurements and/or by location, identify the inconsistent values and make additional measurements, increasing the number of interventions and the related risks.

For example, systems are known such as in patent application WO 2008/157298 filed on Dec. 24, 2008. However, such systems do not make it possible to prevent the intrusion of particles inside the device.

SUBJECT OF THE INVENTION

The present invention aims to remedy all or part of these drawbacks.

To this end, according to a first aspect, the present invention envisages a self-contained detector for measuring a physical quantity, which comprises:
- at least one sensor for sensing a value representing a physical quantity;
- a geolocation means, configured to provide geolocation coordinates of the detector;
- an emitter of a wireless signal representing each detected value and the coordinates determined; and
- a self-contained electric power source configured to power the detector, each sensor, the geolocation means, the emitter and the power source being embedded in a flexible, shock-resistant shell, and in a sealed shell.

Thanks to these provisions, the measurement of a physical quantity enables the production of a map, for example, which can be carried out automatically by means of a set of measurements from similar detectors. The shells enable the detector to be thrown or released onto an onshore and/or marine site, from a drone for example, this detector transmitting both an item of geolocation data and an item of measurement data. In addition, the sealed nature of the shell makes it possible to prevent the intrusion of particles inside the detector.

These provisions therefore make it possible to quickly investigate in large-scale or inaccessible locations likely to present a risk to human health, in order to establish an estimate of the radiological activity and/or other types of analyses according to the safety conditions to be controlled.

In addition, the detector that is the subject of the present invention makes it possible to successively send wireless signals so as to update the measurement.

In some embodiments, the space inside the shell, between each sensor, the geolocation means, the emitter and the power source, is filled with foam or air.

These embodiments make it possible to ensure the detector's resilience to shocks.

In some embodiments, the emitter also acts as a receiver, the detector comprising a means for determining an emission frequency configured to cause a signal to be emitted, by the emitter, as a function of frequency information contained in a signal received by the receiver.

These embodiments make it possible to optimize the energy longevity of the detector in long-term operations, for example.

In some embodiments, the detector that is the subject of the present invention comprises a means for communicating at a distance less than the communication distance of a local wireless network.

These embodiments allow the detector to be configured prior to deployment or allow it to serve as emitter in a standard use of the device or inside, depending on the nature of the site to be analyzed.

According to a second aspect, the present invention envisages a device for mapping measurements of a physical quantity, which comprises:
- at least one self-contained detector that is the subject of the present invention; and
- a receiver of at least one wireless signal emitted by at least one detector; and
- a display system configured to display at least one representative value received in the signal and an item of information representative of the coordinates associated with the value received.

Thanks to these provisions, a map of the measurements can be produced, the map produced being able to evolve in real time.

In some embodiments, the device that is the subject of the present invention comprises a means for distributing each detector over a site intended to be mapped by the device.

These embodiments enable each detector to be positioned, possibly automatically, in locations out of reach by people in particular.

In some embodiments, the device that is the subject of the present invention comprises a means for generating a map of isoline curves and a variance map as a function of each value and coordinate, associated to each said value, received.

As a variance map makes it possible to illustrate the uncertainties associated to the isoline curve map, this map therefore makes it possible to know the reliability of the data and to supplement them as necessary.

These embodiments make it possible to display an overall map from reliable specific measurements and an algorithm providing additional estimated values.

In some embodiments, the device that is the subject of the present invention comprises:
- a self-contained electric power source using rechargeable or disposable batteries; and
- a means for transferring electric power to at least one detector connected to the power source.

These embodiments make it possible to charge or recharge a detector connected to the power source, which makes the device mobile and more sustainable with regard to power.

In some embodiments, the device that is the subject of the present invention comprises a means for determining the coordinates of a detector to be positioned as a function of coordinates received from at least two detectors; and a means for displaying coordinates determined.

These embodiments make it possible to suggest to a user of the device a preferred position of a detector not yet distributed so as to improve the reliability of the map produced.

In some embodiments, the device that is the subject of the present invention comprises a means for communicating, to an external communicating terminal, at least one item of information representative of at least one value received by the device, and at least one item of information representative of the coordinates associated with the value received.

These embodiments make it possible, for example, to display information on a head-up display, smartphone or any other external terminal.

According to a third aspect, the present invention envisages a method for mapping measurements of a physical quantity on a site, which comprises:
- a step of distributing over the site at least one detector that is the subject of the present invention;
- a step wherein each detector captures a value representative of a physical quantity;
- a step wherein each detector geolocates said detector;
- a step wherein each detector emits a wireless signal representative of the geolocation value and coordinates determined during the geolocation step;
- a step wherein a receiver receives each wireless signal emitted by each detector; and
- a step of displaying, on a screen, at least one representative value received in the signal at a position on the screen corresponding to the coordinates associated with the value received.

As the particular aims, advantages and features of the method that is the subject of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the detector, device and method that are the subjects of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way.

It is now noted that the figures are not to scale.

Figure 1:
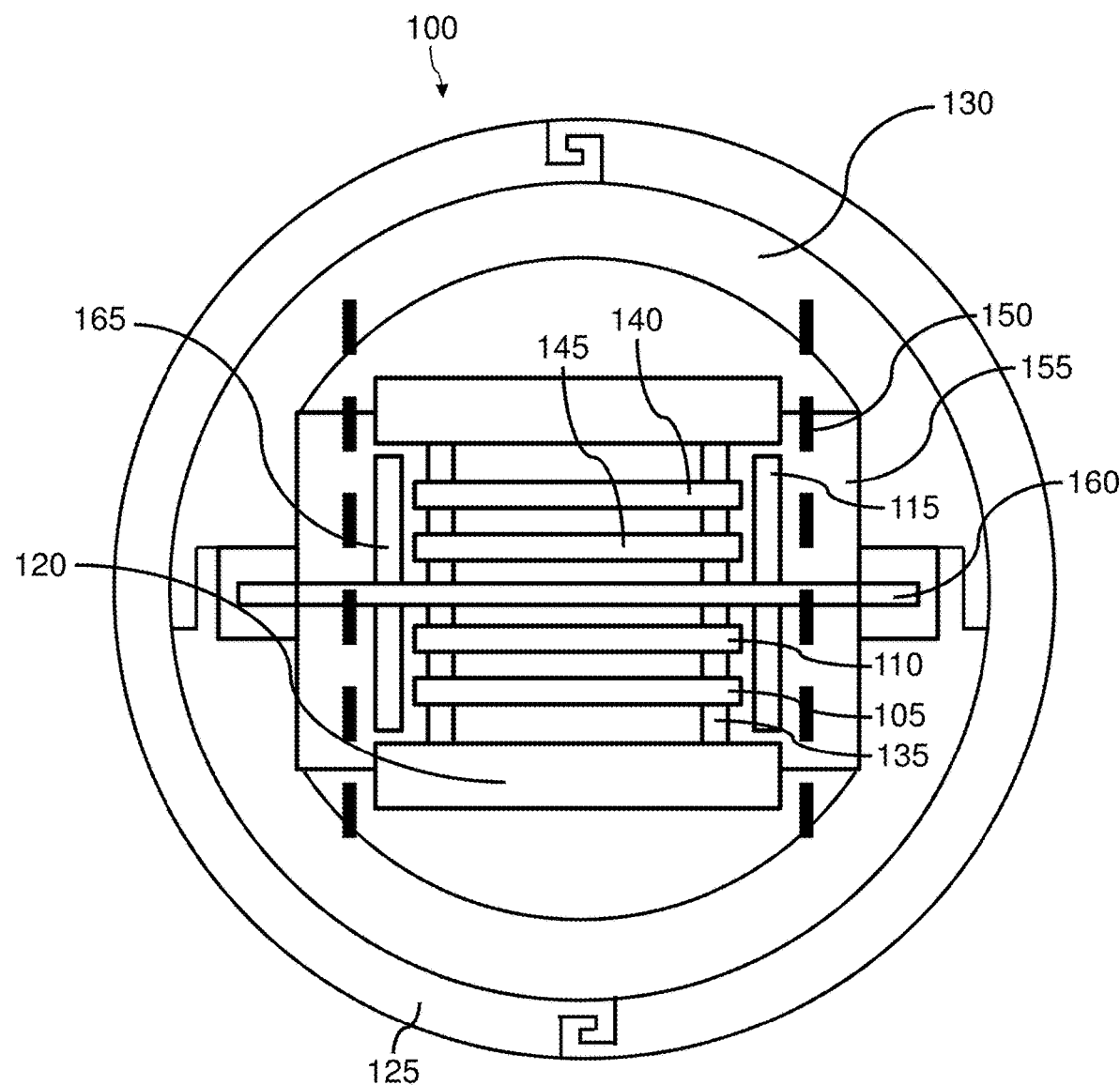
FIG. 1 represents, schematically, a particular embodiment of the detector that is the subject of the present invention.

FIG. 1, which is not to scale, shows a schematic view of an embodiment of the detector 100 that is the subject of the present invention. This self-contained detector 100 for measuring a physical quantity comprises:
- at least one sensor 105 for sensing a value representing a physical quantity;
- a geolocation means 110, configured to provide geolocation coordinates of the detector;
- an emitter 145 and/or receiver of a wireless signal representing each detected value and the coordinates determined; and
- a self-contained electric power source 120 configured to power the detector;

each sensor, the geolocation means, the emitter and the power source being embedded in a flexible, shock-resistant shell 125, and in a sealed shell 130.

The sensor 105 measures, for example, a flow of particles and/or energy of the particles.

This sensor 105 is, for example:
- a sensor utilizing the ionization of a gas by the radiation emitted by radioactive elements near the detector 100;
- a scintillation sensor;
- a sensor using the darkening of photographic films;
- a thermoluminescent sensor;
- a semiconductor sensor;
- a dosimetry sensor using electron paramagnetic resonance; or
- a chemical dosimetry sensor.

As the operation of these various sensors is described in the reference works of the field of radiological measurements, it is not repeated here.

This sensor 105 is preferably designed to capture and quantify gamma radiation.

This sensor 105 is embedded in an electronic board, also called a printed circuit.

In some variants, this sensor 105 captures a temperature, a movement speed of the detector 100, a motion or vibrations, kinetic energy, a pollutant or a pressure.

The geolocation means 110 is, for example, a GPS (for "Global Positioning System") tracking system, whose widely-documented operation is not repeated here.

This geolocation means 110 is embedded in an electronic board, also called a printed circuit, that is the same as or separate from the board associated to the sensor 105.

The emitter and/or receiver 145 is, for example, an electronic chip implementing:
the GPRS (for "General Packet Radio Service") standard;
SigFox (registered trademark) technology;
LoRA (registered trademark) technology; or
spread spectrum transmission technology.

The choice of the technology used is determined according to the desired optimization between the detector 100 and the receiver (not shown) of the signal emitted by the emitter and/or receiver 145.

This emitter and/or receiver 145 is embedded in an electronic board, also called a printed circuit, that is the same as or separate from the board associated to the sensor 105 and/or to the geolocation means 110.

The emitter and/or receiver 145 is accompanied by an antenna 115 specific to the communications technique utilized.

The location means 110 is accompanied by an antenna 165 specific to the location technique utilized.

The self-contained electric power source 120 is, for example, a battery or cell. This battery can be any type known to the person skilled in the art. In some variants, the power source 120 comprises several batteries.

Each sensor 105, the geolocation means 110, the emitter and/or receiver 145 and the power source 120 are embedded in the shells 125 and 130.

The inner shell, 130, is made, for example, of a rigid plastic material, such as polyethylene, with a density close to 1 $g/cm^3$ to simulate the absorption of gamma rays by the human body.

The outer shell 125 is made, for example, of a material, such as polyurethane, filled with air and with a density close to 0.1 $g/cm^3$.

These shells 125 and 130 can be produced as a single part, molded around the components. In some variants, these shells can be formed of two parts clipped or glued together.

In some variants, the shells 125 and 130 can comprise several layers made of a single material or of different materials.

In some variants the shells 125 and 130 have a spherical shape.

In some embodiments, the self-contained detector 10 for measuring a physical quantity is embedded in a different shape to the different investigation devices, for example. In some embodiments, the device 10 is embedded in a remote-controlled investigation robot, or equipment for analyzing a site, such as a device for extracting soil samples, especially core sampling, for example.

In some preferred embodiments, such as that shown in FIG. 1, the inner space 155 of the shells 125 et 130, between each sensor 105, the geolocation means 110, the emitter and/or receiver 145 and the power source 120 are, is filled with foam.

This foam is, for example, polyurethane foam.

In some variants, the inner space 155 is filled with air.

In some preferred embodiments, such as that shown in FIG. 1, at least two elements, from amongst each sensor 105, the geolocation means 110 and/or the emitter and/or receiver 145, are each mounted on at least one different board.

In the case where several boards are utilized, the boards are fixed to each other via bushings 135 or silentbloc (registered trademark) ensuring the mechanical performance and absorption of shocks.

The bushings are fixed to a plate 160 retained by the shell 130. This plate, preferably made of ebonite, enables shocks to be absorbed.

In some preferred embodiments, such as that shown in FIG. 1, the detector 100 comprises a means 140 for determining an emission frequency configured to cause a signal to be emitted, by the emitter, as a function of frequency information contained in a signal received by the receiver.

This determination means 140 is, for example, a computer system embedded in an electronic board.

In some preferred embodiments, such as that shown in FIG. 1, the detector 100 comprises a means 140 for communicating at a distance less than the communication distance of a local wireless network.

This communication means 140 is, for example, an electronic chip configured to emit wireless signals using standard IEEE 802.11, known as "Wi-Fi", or Bluetooth technology (registered trademark).

This communication means 140 is embedded in an electronic board, also called a printed circuit, that is the same as or separate from the board associated to the sensor 105, the geolocation means 110 and/or the emitter and/or receiver 145.

In some embodiments, not shown, the sensor 105 is configured to sense the presence of the material to be detected and/or quantified near the detector 100. In these embodiments, the shells, 125 and 130, comprise holes allowing the passage of air from the outside environment through to the sensor 105.

In these embodiments, the detector 100 comprises a circuit for supplying air by aspiration making it possible to bring outside air to a circuit inside the detector 100 and near the sensor 105. The sensor 105 is positioned inside the air circuit, and is connected to the detector 100 via a sealed cable-gland.

In some embodiments, not shown, this shell, 125 and 135, is transparent and the detector 100 comprises at least one camera, positioned inside the shell, oriented towards the outside of the detector 100. In some preferred embodiments, the detector 100 comprises several such cameras.

In some embodiments, not shown, the detector 100 comprises a motor to cause a rotation of the shells 125 and 130, so as to allow the movement of the detector 100.

In order to move the device, the shell and the internal elements are separate and the device comprises motors connected to wheels inside the shells making it possible to initiate the rotation of the detector about itself.

Figure 2:
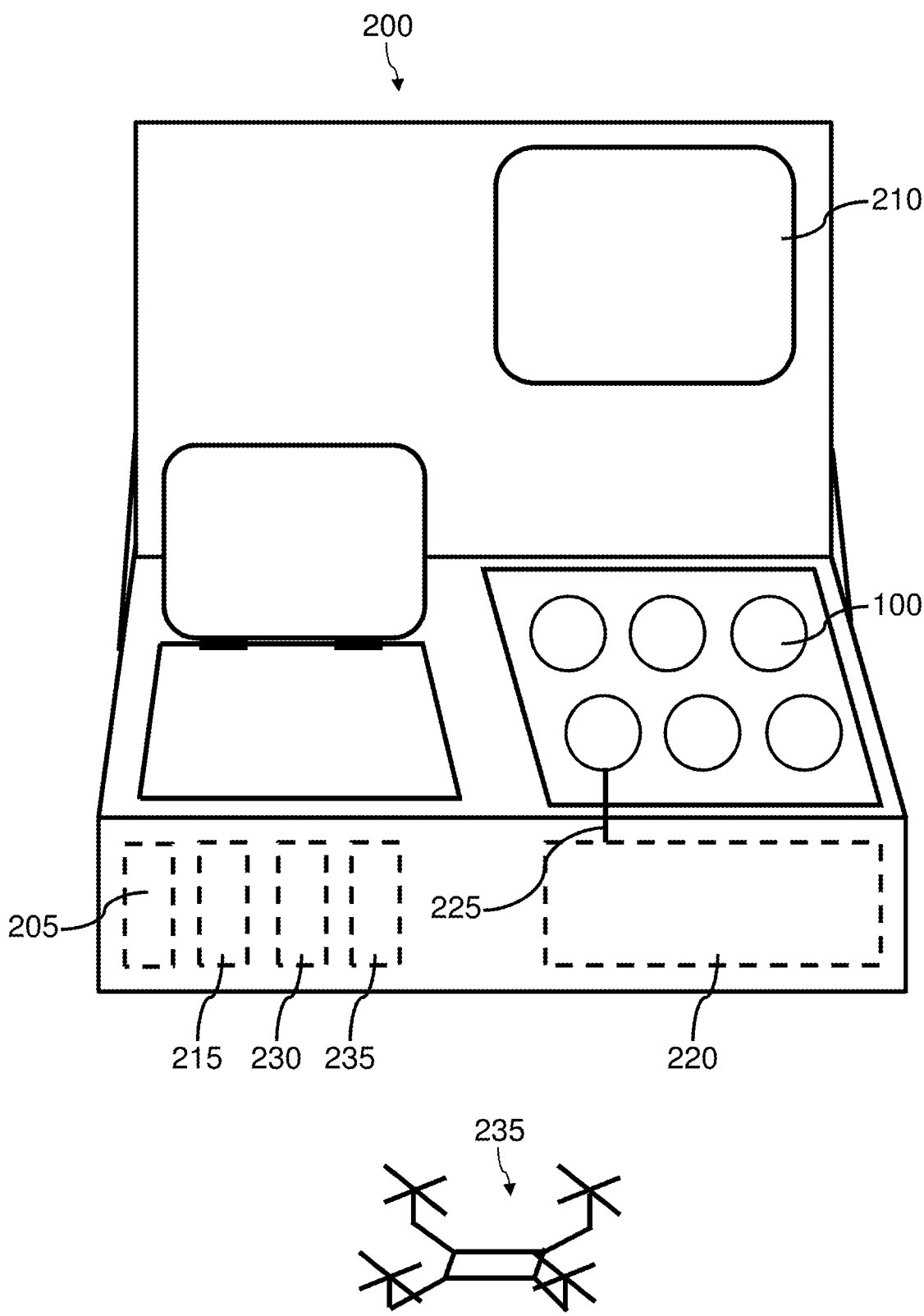
FIG. 2 represents, schematically, a particular embodiment of the device that is the subject of the present invention.

FIG. 2 shows, schematically, a particular embodiment of the device 200 that is the subject of the present invention. This device 200 for mapping measurements comprises:
at least one self-contained detector 100 as described with regard to FIG. 1; and
a receiver 205 of at least one wireless signal emitted by at least one detector; and
a display system 210 configured to display at least one representative value received in the signal and an item of information representative of the coordinates associated with the value received.

The receiver 205 is, for example, configured to receive wireless signals using a technique matching the emission technique of the emitter 115.

In some embodiments, the device 200 comprises a memory configured to record each value and each associated position received.

In some preferred embodiments, such as that shown in FIG. 2, the device 200 comprises a means 235 for distributing each detector 100 over a site intended to be mapped by the device.

This distribution means 235 is, for example, a land or air drone comprising a means (not shown) of grasping at least one detector 100. This distribution means 235 is controlled by a control means (not shown) of the device 200 or by a dedicated control means.

In some preferred embodiments, such as that shown in FIG. 2, the device 200 comprises a means 215 for generating a map of isoline curves and a variance map as a function of each value and coordinate, associated to each said value, received.

In the context of radiological detection, the isoline in question is, for example, an isodose.

Figure 4:
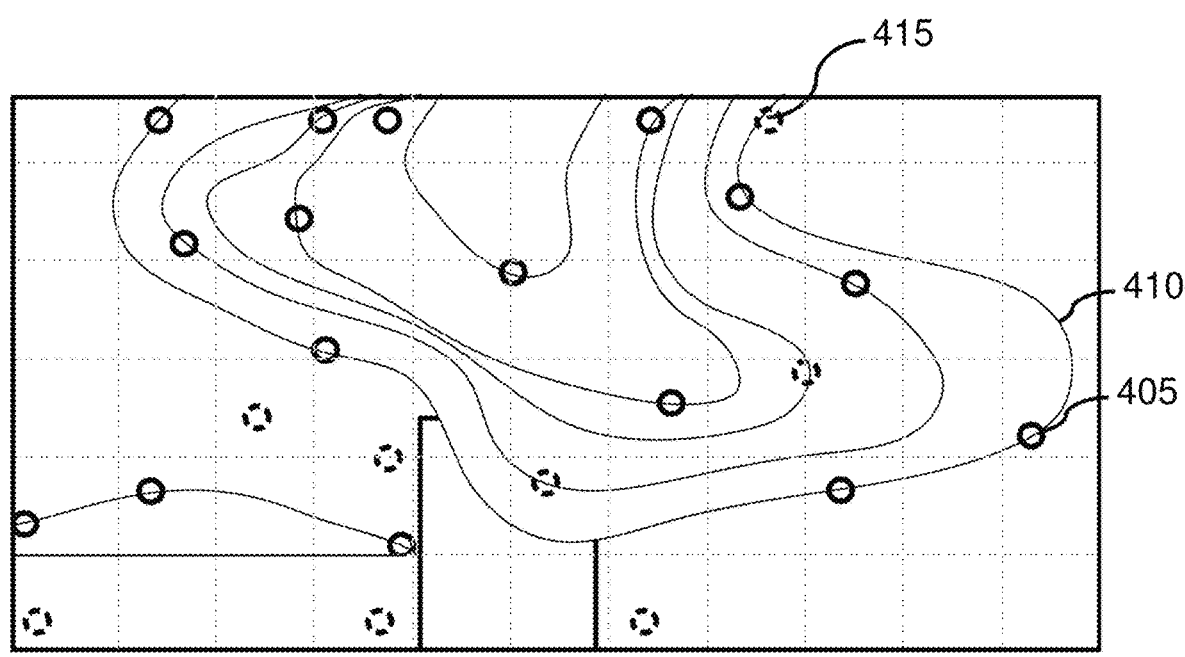
FIG. 4 represents, schematically, an example of isoline curves that can be generated by the device.

This generation means 215 is, for example, a computer system embedded in an electronic control circuit of the display system 210, such as a screen for example. An example of a map generated in this way is shown in FIG. 4.

This map shows:
the position 405 of detectors 100 deployed on a site;
the recommended position 415 of new detectors 100 on the site; and
the isolines 410 estimated by the device 200.

In some preferred embodiments, such as that shown in FIG. 2, the device 200 comprises:
a self-contained electric power source 220; and
a means 225 for transferring electric power to at least one detector 100 connected to the power source.

The power source 220 is, for example, a battery charged by connecting to an external power source (not shown) or by collecting renewable energies, via a solar panel for example.

The transfer means 225 is, for example, a cable-based or induction battery charger.

In some preferred embodiments, such as that shown in FIG. 2, the device 200 comprises a means 230 for determining the coordinates of a detector 100 to be positioned as a function of coordinates received from at least two detectors, and a means 210 for displaying coordinates determined.

This determination means 230 is, for example, a computer system embedded in an electronic circuit. This computer system determines an uncertainty value associated with each estimated value, and results in a recommendation to position a detector 100 at the coordinates associated with the uncertainty value.

In some embodiments, such as that shown in FIG. 2, the device 200 comprises an interface for programming each detector 100. This programming interface makes it possible to test the detector 100 before this detector 100 is distributed on the site.

This programming interface also allows a user to enter a signal emission frequency, the entered frequency being recorded by each detector 100, the emitter 115 of each detector 100 emitting a signal according to the frequency recorded.

In some embodiments, the receiver 205 also acts as an emitter of a signal emission frequency, entered by a user, to at least one detector 100, the emitter 115 of each detector 100 emitting a signal according to the frequency emitted.

In some embodiments, the device 200 comprises a means (not shown) for transmitting each value and position displayed on the screen 115, preferably in the form of a map, to a remote terminal.

In some embodiments, the device 200 comprises a means 235 for communicating, to an external communicating terminal, at least one item of information representative of at least one value received by the device, and at least one item of information representative of the coordinates associated with the value received.

The external communicating terminal is, for example:
a computer, possibly portable;
a connected watch;
a head-up display; or
a GPS navigator display device.

Figure 3:
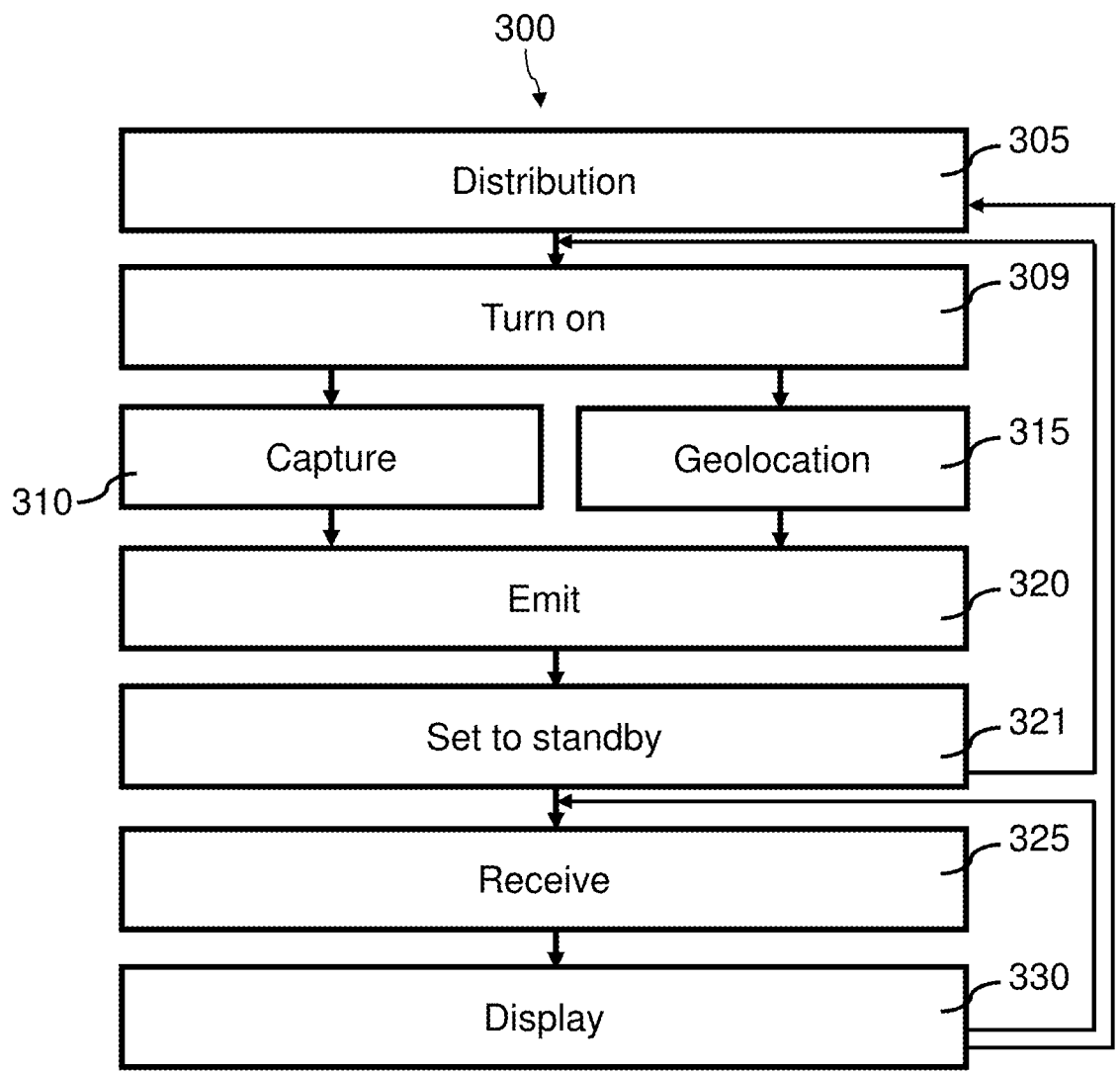
FIG. 3 represents, schematically and in the form of a logical diagram, a particular series of steps of the method that is the subject of the present invention.

FIG. 3 shows a logical diagram of particular steps of the method 300 that is the subject of the present invention. This method 300 for mapping measurements of a physical quantity on a site comprises:
a step 305 of distributing over a site at least one detector 100 as described with regard to FIG. 1;
a step 309 of turning on each distributed detector;
a step 310 wherein each detector captures a value representative of a physical quantity;
a step 315 wherein each detector geolocates said detector;
a step 320 wherein each detector emits a wireless signal representative of the geolocation value and coordinates determined during the geolocation step;
a step 321 of setting each distributed detector to standby mode;
a step 325 wherein a receiver receives each wireless signal emitted by each detector; and
a step 330 of displaying, on a screen, at least one representative value received in the signal at a position on the screen corresponding to the coordinates associated with the value received.

In some embodiments, the method 300 that is the subject of the present invention comprises a step of generating isodose curves and an associated variance map, these curves and this map being displayed during the display step 330.

This method 300 is performed, for example, by utilizing the device 200 that is the subject of the present invention.

The invention claimed is:
1. Device for mapping measurements of a physical quantity, comprising:
a plurality of self-contained detectors for measuring a physical quantity;
each one of said self-contained detectors includes:
at least one sensor for sensing a value representing a physical quantity;
a geolocator, configured to provide geolocation coordinates of the detector;
an emitter of a first wireless signal representing each detected value and the determined coordinates, the emitter also acts as a receiver for receiving a second wireless signal containing information regarding emission frequency of said first wireless signal;
a frequency determinor for determining an emission frequency configured to cause the emitter to emit said first wireless signal as a function of said information in said second wireless signal; and
a self-contained electric power source configured to power the detector,
each sensor, the geolocator, the emitter and the power source being embedded in a flexible, shock-resistant shell, and in a sealed shell said device further comprising:
a receiver for receiving said first wireless signal emitted by each one of said detectors; and a display system configured to display said detected value and said determined coordinates received in the first wireless signal from each one of said detectors; and a coordinates determinator for determining new coordinates for positioning an additional detector, said new coordinates are determined as a function of coordinates received from at least two of said detectors; and a means for displaying said new coordinates.

2. Device according to claim 1, which comprises a distributor for distributing each detector over a site intended to be mapped by the device.

3. Device according to claim 1, which comprises a generator for generating a map of isoline curves and a variance map as a function of each value and coordinate, associated to each said value, received.

4. Device according to claim 1, which comprises:
a self-contained electric power source using rechargeable or disposable batteries; and
a conveyor for transferring electric power to at least one detector connected to the power source.

5. Device according to claim 1, which comprises a communicator for communicating, to an external communicating terminal, at least one item of information representative of at least one value received by the device, and at least one item of information representative of the coordinates associated with the value received.

6. The device according to claim 1, wherein the determinator for determining the coordinates of a detector to be positioned as a function of coordinates received from at least two detectors, determines an uncertainty value associated with each estimated value, and selects coordinates associated with the uncertainty value.

7. Method for mapping measurements of a physical quantity on a site, comprising:
a step of distributing over a site a plurality of detectors;
a step wherein each detector captures a value representative of a physical quantity;
a step wherein each detector geolocates said detector;
a step of sending said detector a second wireless signal containing information regarding emission frequency;
a step wherein each detector emits a first wireless signal representative of the geolocation value and coordinates determined during the geolocation step, said first wireless signal is emitted with an emission frequency determined as a function of said information in said second wireless signal;
a step wherein a receiver receives each wireless signal emitted by each detector;
a step of displaying, on a screen, at least one representative value received in the signal at a position on the screen corresponding to the coordinates associated with the value received; and
determining new coordinates for positioning an additional detector, said new coordinates are determined as a function of coordinates received from at least two detectors; and
displaying said new coordinates.

8. The method according to claim 7, wherein determining the coordinates of a detector to be positioned as a function of coordinates received from at least two detectors, comprises determining an uncertainty value associated with each estimated value, and selecting coordinates associated with the uncertainty value.

* * * * *